United States Patent
Sato et al.

(10) Patent No.: US 10,781,101 B2
(45) Date of Patent: Sep. 22, 2020

(54) SOLID ELECTROLYTE PRODUCTION METHOD USING A MULTI-AXIAL KNEADING MACHINE

(71) Applicant: Idemitsu Kosan Co., Ltd., Tokyo (JP)

(72) Inventors: Atsushi Sato, Ichihara (JP); Minoru Senga, Sodegaura (JP); Masao Aida, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 15/736,969

(22) PCT Filed: Jun. 16, 2016

(86) PCT No.: PCT/JP2016/068011
§ 371 (c)(1),
(2) Date: Dec. 15, 2017

(87) PCT Pub. No.: WO2016/204255
PCT Pub. Date: Dec. 22, 2016

(65) Prior Publication Data
US 2018/0170756 A1  Jun. 21, 2018

(30) Foreign Application Priority Data
Jun. 17, 2015 (JP) ................. 2015-122373

(51) Int. Cl.
*C01B 25/14* (2006.01)
*H01M 10/0562* (2010.01)
(Continued)

(52) U.S. Cl.
CPC .............. *C01B 25/14* (2013.01); *C01B 17/22* (2013.01); *C01D 15/04* (2013.01); *H01B 13/00* (2013.01);
(Continued)

(58) Field of Classification Search
CPC ......... C01B 25/14; C01B 17/22; C01D 15/04; H01M 6/18; H01M 10/0562; H01B 13/00; C01P 2002/72
(Continued)

(56) References Cited

U.S. PATENT DOCUMENTS

| 4,824,256 A | 4/1989 | Haring |
| 6,079,865 A | 6/2000 | Plavcan |

(Continued)

FOREIGN PATENT DOCUMENTS

| CN | 1257612 A | 6/2000 |
| CN | 104412338 A | 3/2015 |

(Continued)

OTHER PUBLICATIONS

International Search Report dated Jul. 5, 2016 issued in corresponding PCT/JP2016/068011 application (1 page).
(Continued)

*Primary Examiner* — Gary D Harris
(74) *Attorney, Agent, or Firm* — Millen, White, Zelano & Branigan, PC; Ryan Pool

(57) ABSTRACT

The invention provides a method for producing a solid electrolyte, which includes reacting two or more kinds of solid raw materials using a multi-axial kneading machine to give a crystalline solid electrolyte, and which can provide a crystalline solid electrolyte with excellent productivity.

12 Claims, 2 Drawing Sheets

(51) Int. Cl.
    *H01M 6/18* (2006.01)
    *H01B 13/00* (2006.01)
    *C01B 17/22* (2006.01)
    *C01D 15/04* (2006.01)
(52) U.S. Cl.
    CPC ......... *H01M 6/18* (2013.01); *H01M 10/0562* (2013.01); *C01P 2002/72* (2013.01)
(58) Field of Classification Search
    USPC ....................................................... 429/322
    See application file for complete search history.

(56) References Cited

U.S. PATENT DOCUMENTS

| | | | | |
|---|---|---|---|---|
| 6,200,707 | B1* | 3/2001 | Takada | H01M 4/621 |
| | | | | 429/212 |
| 9,859,562 | B2 | 1/2018 | Koshika | |
| 2004/0188880 | A1* | 9/2004 | Bauer | H01G 9/00 |
| | | | | 264/109 |
| 2015/0162614 | A1* | 6/2015 | Koshika | H01M 4/13 |
| | | | | 429/189 |
| 2015/0171464 | A1 | 6/2015 | Kambara et al. | |

FOREIGN PATENT DOCUMENTS

| | | |
|---|---|---|
| DE | 1199737 B | 9/1965 |
| EP | 2869371 A1 | 5/2015 |
| JP | 2007-220377 A | 8/2007 |
| JP | 2010-39889 A | 2/2010 |
| JP | 2012-48884 A | 3/2012 |
| JP | 2012199003 A | 10/2012 |
| JP | 2012243476 A | 12/2012 |

OTHER PUBLICATIONS

English Abstract of JP 2007-220377 A published Aug. 30, 2007.
English Abstract of JP 2010-039889 A published Feb. 18, 2010.
English Abstract of JP 2012-048884 A published Mar. 8, 2012.
Supplementary search report for EP appln. No. 16811729 dated Nov. 13, 2018 (pp. 1-10).
Office Action in corresponding CN 2016-80035143.3 (pp. 1-11) dated Feb. 3, 2019 (English translation).
Office Action/communication in corresponding EP 16811729.9 (pp. 1-6) dated Aug. 16, 2019.
Translation of Second Office Action/communication in corresponding CN 201680035143.3 on Oct. 21, 2019 (pp. 1-11).
Li Xiaoling, "Rubber Blend", Apr. 30, 1998, pp. 149-152, Chemical Industry Press Co., Ltd., China.
Office Action in the corresponding Japanese patent application No. 2017-524838, dated Feb. 4, 2020 (pp. 1-2) and English translation (pp. 1-2).
Office Action in corresponding JP Application No. 2017-524838, dated May 12, 2020 (pp. 1-2) and English translation (pp. 1-2).
Office Action in corresponding CN Application No. 201680035143. 3, dated Jul. 7, 2020 (pp. 1-11) and English translation (pp. 1-14).
Lu Zhen-xi, Lu Shou-dao ED, "Food machinery principles and design", China Light Industry Press, 1st edition, May 5, 1995, "Structure Type of Screw Press", p. 267.
Geng Hau-ching, ED.,"Plastic Mixing and Continuous Mixing Equipment", China Light Industry Press, 1st Edition, Jan. 2008, "Screw Element", pp. 195-196.
Yang Ming-shan, ED."Practical Techniques and Applications for Plastics Modifications", Printing Industry Press, 1st Edition, Jun. 2014, "Screw Combination and Feeding Technology", pp. 158-159.

* cited by examiner

[Fig. 1]
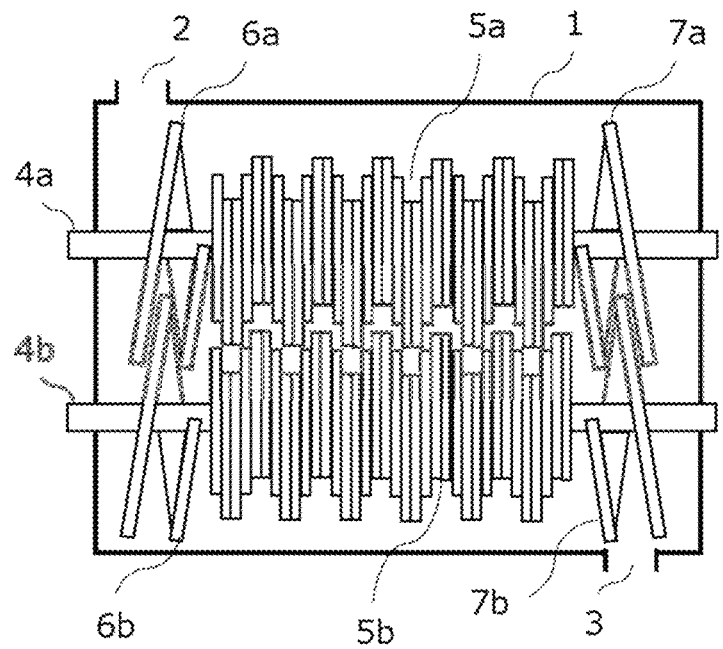
[Fig. 2]
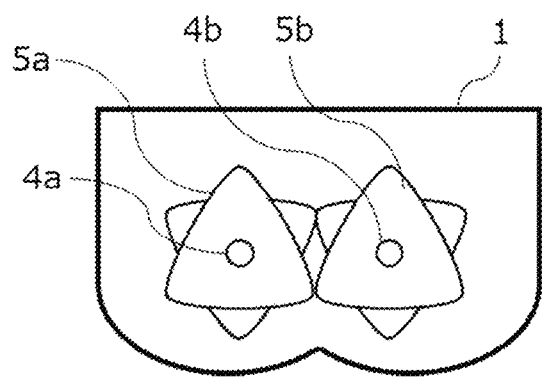

[Fig. 3]
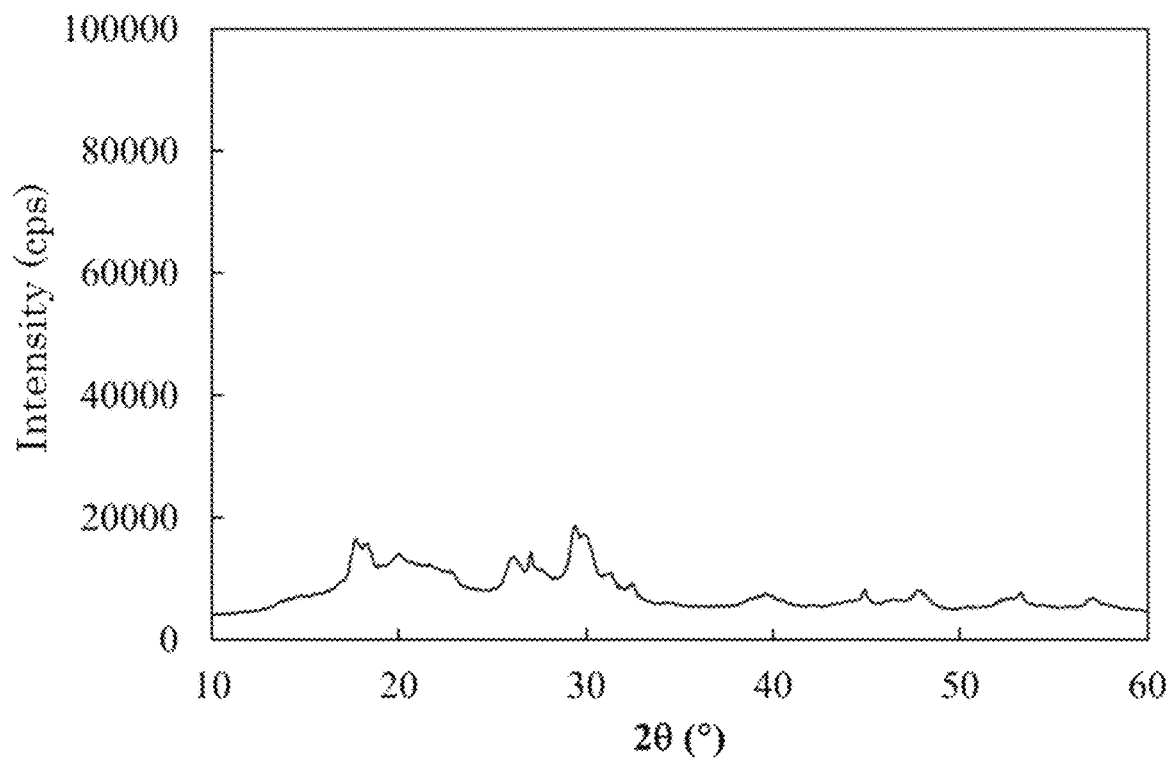
[Fig. 4]
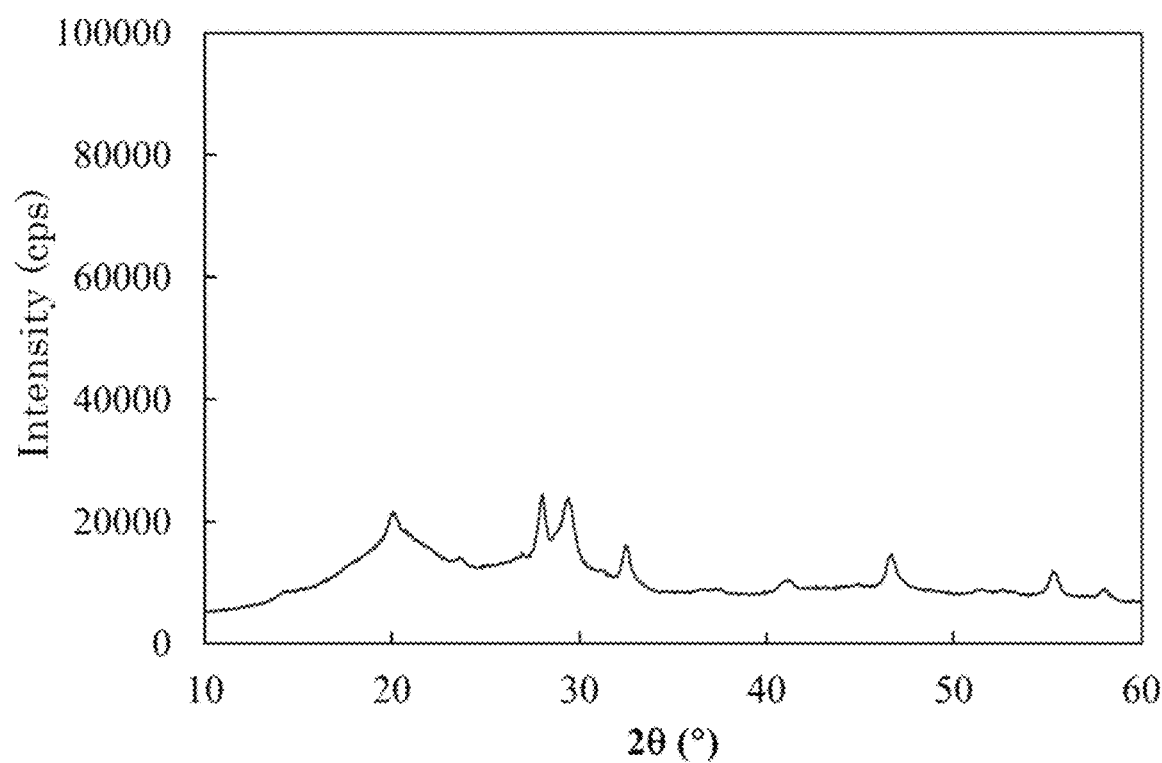

SOLID ELECTROLYTE PRODUCTION METHOD USING A MULTI-AXIAL KNEADING MACHINE

TECHNICAL FIELD

The present invention relates to a solid electrolyte production method.

BACKGROUND ART

With rapid spread of information-related instruments, communication instruments and others such as personal computers, video cameras, cell phones and the like in recent years, development of batteries that are utilized as power sources for them is considered to be important. Heretofore, in batteries for such uses, an electrolytic solution containing a flammable organic solvent has been used, but development of batteries having a solid electrolyte layer in place of an electrolytic solution is being made, which are solid as a whole not using a flammable organic solvent inside the batteries, in which, therefore, a safety unit can be simplified and which can drive down manufacturing costs and are excellent in productivity.

As a solid electrolyte for use in the solid electrolyte layer, there is known an amorphous solid electrolyte or a crystalline solid electrolyte, which is adequately selected depending on the use and the desired performance. Heretofore, for producing a crystalline solid electrolyte, a method of preparing an amorphous solid electrolyte by reaction of raw materials according to a mechanical milling method, a slurry method, a melting and a rapidly cooling method or the like followed by heat-treating the amorphous solid electrolyte, and a method of reacting raw materials at a high temperature of 200° C. or so according to a mechanical milling method or the like have been employed (for example, PTL 1). The method of the invention described in PTL 1 includes mechanically milling raw materials at 60° C. or higher and 160° C. or lower to give an amorphous solid electrolyte and heat-treating it at 200° C. or higher and 360° C. or lower to give a crystalline solid electrolyte. Comparative Examples 2 and 3 in PTL 1 disclose a process of mechanically milling raw materials at a high temperature of 170° C. or 200° C. to give a crystalline solid electrolyte.

CITATION LIST

Patent Literature

PTL 1: JP 2010-039889 A

BRIEF DESCRIPTION OF DRAWINGS

FIG. 1 is a plane view cut at the center of a rotary shaft of a multi-axial kneading machine for use in the present invention.

FIG. 2 is a plan view cut vertically to the rotary shaft in a part provided with paddles of the rotary shaft of the multi-axial kneading machine for use in the present invention.

FIG. 3 is an X-ray analysis spectrum of a crystalline solid electrolyte obtained in Example 1.

FIG. 4 is an X-ray analysis spectrum of a crystalline solid electrolyte obtained in Example 2.

SUMMARY OF INVENTION

Technical Problem

However, the method relating to the invention described in PTL 1 includes two steps of mechanical milling treatment and mixing followed by heat treatment, and therefore the process is often complicated. According to the method described in Comparative Examples 2 and 3 in PTL 1, a crystalline solid electrolyte could be obtained even though the mechanical milling treatment is not followed by separate heat treatment, but the method could not be said to be excellent in productivity.

The present invention has been made in consideration of the situation as above, and its object is to provide a method for producing a crystalline solid electrolyte excellent in productivity, as well as a multi-axial kneading machine.

Solution to Problem

The present inventors have assiduously studied for the purpose of solving the above-mentioned problems and, as a result, have found that the problems can be solved by the following invention.

[1] A method for producing a solid electrolyte, including reacting two or more kinds of solid raw materials using a multi-axial kneading machine to give a crystalline solid electrolyte.

[2] The method for producing a solid electrolyte according to the above [1], wherein the reaction is carried out in a solid state.

[3] The method for producing a solid electrolyte according to the above [1] or [2], wherein the solid raw materials contain a lithium element, a phosphorus element and a sulfur element.

[4] The method for producing a solid electrolyte according to the above [3], wherein the solid raw materials contain at least one of a lithium compound and a lithium metal elementary substance, and at least one of a phosphorus compound and a phosphorus elementary substance.

[5] The method for producing a solid electrolyte according to the above [3] or [4], wherein the solid raw materials contain lithium sulfide and phosphorus sulfide.

[6] The method for producing a solid electrolyte according to any one of the above [3] to [5], wherein the solid raw materials further contain a halogen element.

[7] The method for producing a solid electrolyte according to the above [6], wherein the halogen element is at least one of bromine and iodine.

[8] The method for producing a solid electrolyte according to the above [6] or [7], wherein the solid raw materials contain at least one of lithium bromide and lithium iodide.

[9] A method for producing an inorganic material, including reacting two or more kinds of solid raw materials using a multi-axial kneading machine to give a crystalline inorganic material.

[10] A multi-axial kneading machine for use in production of a crystalline solid electrolyte, the production including reacting two or more kinds of solid raw materials.

[11] A method for producing a solid electrolyte, including reacting two or more kinds of solid materials containing lithium sulfide and phosphorus sulfide, using a multi-axial kneading machine, to give a crystalline solid electrolyte containing a lithium element, a phosphorus element and a sulfur element.

[12] A method for producing a solid electrolyte, including reacting two or more kinds of solid raw materials containing lithium sulfide, phosphorus sulfide, and at least one of lithium bromide and lithium iodide, using a multi-axial kneading machine, to give a crystalline solid electrolyte containing a lithium element, a phosphorus element, a sulfur element, and at least one of a bromine element and an iodine element.

[13] A method for producing a solid electrolyte, including reacting two or more kinds of solid raw materials containing lithium sulfide and phosphorus sulfide, using a multi-axial kneading machine, to give a crystalline solid electrolyte containing a lithium element, a phosphorus element and a sulfur element, wherein the temperature at the reaction is not lower than the crystallization temperature of the crystal structure that the crystalline solid electrolyte has.

[14] A method for producing a solid electrolyte, including reacting two or more kinds of solid raw materials containing lithium sulfide, phosphorus sulfide, and at least one of lithium bromide and lithium iodide, using a multi-axial kneading machine, to give a crystalline solid electrolyte containing a lithium element, a phosphorus element, a sulfur element, and at least one of a bromine element and an iodine element, wherein the temperature at the reaction is not lower than the crystallization temperature of the crystal structure that the crystalline solid electrolyte has.

[15] A method for producing a solid electrolyte, including reacting two or more kinds of solid raw materials containing lithium sulfide and disphosphorus pentasulfide using a multi-axial kneading machine to give a crystalline solid electrolyte containing a lithium element, a phosphorus element and a sulfur element.

[16] A method for producing a solid electrolyte, including reacting two or more kinds of solid raw materials containing lithium sulfide, diphosphorus pentasulfide, and at least one of lithium bromide and lithium iodide, using a multi-axial kneading machine, to give a crystalline solid electrolyte containing a lithium element, a phosphorus element, a sulfur element, and at least one of a bromine element and an iodine element.

[17] A method for producing a solid electrolyte, including reacting two or more kinds of solid raw materials containing lithium sulfide and diphosphorus pentasulfide using a multi-axial kneading machine to give a crystalline solid electrolyte containing a lithium element, a phosphorus element and a sulfur element, wherein the temperature at the reaction is not lower than the crystallization temperature of the crystal structure that the crystalline solid electrolyte has.

[18] A method for producing a solid electrolyte, including reacting two or more kinds of solid raw materials containing lithium sulfide, diphosphorus pentasulfide, and at least one of lithium bromide and lithium iodide, using a multi-axial kneading machine, to give a crystalline solid electrolyte containing a lithium element, a phosphorus element, a sulfur element, and at least one of a bromine element and an iodine element, wherein the temperature at the reaction is not lower than the crystallization temperature of the crystal structure that the crystalline solid electrolyte has.

Advantageous Effects of Invention

According to the present invention, there can be provided a crystalline solid electrolyte with excellent productivity.

DESCRIPTION OF EMBODIMENTS

[Solid Electrolyte Production Method]

The solid electrolyte production method of the present invention includes reacting two or more kinds of solid raw materials using a multi-axial kneading machine to give a crystalline solid electrolyte.

In the present invention, the crystalline solid electrolyte is a solid electrolyte material whose X-ray diffraction pattern in X-ray diffractometry gives a solid electrolyte-derived peak, irrespective of the presence or absence of solid electrolyte raw materials-derived peaks. Specifically, the crystalline solid electrolyte contains a crystal structure derived from the solid electrolyte, in which a part of the crystal structure may be a crystal structure derived from the solid electrolyte, or all the crystal structure may be a crystal structure derived from the solid electrolyte. With that, the crystalline solid electrolyte may partly contain an amorphous solid electrolyte so far as it has the above-mentioned X-ray diffraction pattern.

The above-mentioned amorphous solid electrolyte is one whose X-ray diffraction pattern in X-ray diffractometry is a halo pattern substantially not having any other peak than the materials-derived peaks, irrespective of the presence or absence of solid electrolyte raw materials-derived peaks.

(Solid Raw Materials)

With no specific limitation, the solid raw materials for use in the production method of the present invention may be any ones that contain elements generally constituting crystalline solid electrolytes. For example, as the conductive species capable of expressing ion conductivity, at least one element selected from alkali metals such as lithium, sodium, potassium, rubidium, cesium, francium, etc., and alkaline earth metals such as beryllium, magnesium, calcium, strontium, barium, radium and the like is preferred, and in consideration of the ability of high ion conductivity and the ability to realize high output power of batteries, an alkali metal such as lithium, sodium, potassium, rubidium, cesium, francium, etc., and beryllium are more preferred, and lithium is especially preferred. Specifically, solid raw materials containing at least one element selected from alkali metals such as lithium, sodium, potassium, rubidium, cesium, francium, etc., and alkaline earth metals such as beryllium, magnesium, calcium, strontium, barium, radium and the like are preferred; solid raw materials containing at least one element selected from an alkali metal such as lithium, sodium, potassium, rubidium, cesium, francium, etc., and beryllium are more preferred; and solid raw materials containing a lithium element are especially preferred.

Any other element than the above-mentioned conductive species that may be in the solid raw materials may be adequately selected in accordance with the kinds of the elements constituting the desired solid electrolytes. For example, the crystalline solid electrolytes include, as mentioned below, oxide solid electrolytes, sulfide solid electrolytes, etc., and in consideration of the ability to realize high output power of batteries, sulfide solid electrolytes are preferred. In this case, in consideration of the above-mentioned conductive species and of the purpose of obtaining crystalline sulfide solid electrolytes, the solid raw materials are preferably those containing a lithium element, a phosphorus element and a sulfur element. Using such solid raw materials, solid electrolytes containing a lithium element, a phosphorus element and a sulfur element corresponding to the elements contained in the solid raw materials are obtained.

As the solid raw materials containing a lithium element, at least one of lithium compounds such as lithium sulfide ($Li_2S$), lithium oxide ($Li_2O$), lithium carbonate ($Li_2CO_3$), etc., and a lithium metal elementary substance is preferred; and as the lithium compound, lithium sulfide ($Li_2S$) is especially preferred.

Any lithium sulfide may be used with no specific limitation, but one having a high purity is preferred. Lithium sulfide may be produced, for example, according to the methods described in JP 7-330312 A, JP 9-283156 A, JP 2010-163356 A, and JP 2011-84438 A.

Specifically, lithium hydroxide and hydrogen sulfide are reacted in a hydrocarbon-based organic solvent at 70 to 300° C. to give lithium hydrosulfide, and then the reaction liquid is processed for hydrogen sulfide removal to give lithium sulfide (JP 2010-163356 A). Alternatively, lithium hydroxide and hydrogen sulfide may be reacted in a water-based solvent at 10 to 100° C. to give lithium hydrosulfide, and then the reaction liquid may be processed for hydrogen sulfide removal to give lithium sulfide (JP 2011-84438 A).

In the absence of a solvent, lithium hydroxide may be reacted with hydrogen sulfide to give lithium sulfide. The reaction temperature in this case is, for example, 20 to 300° C., 100 to 250° C., or 120 to 240° C.

As the solid raw materials containing a phosphorus element, for example, at least one of phosphorus sulfides such as diphosphorus trisulfide ($P_2S_3$), diphosphorus pentasulfide ($P_2S_5$), etc., silicon sulfide ($SiS_2$), germanium sulfide ($GeS_2$), boron sulfide ($B_2S_3$), gallium sulfide ($Ga_2S_3$), tin sulfide ($SnS$ or $SnS_2$), aluminum sulfide ($Al_2S_3$), zinc sulfide ($ZnS$), phosphorus compounds such as sodium phosphate ($Na_3PO_4$), etc., and phosphorus elementary substance is preferred. The phosphorus compound is preferably a phosphorus sulfide, and diphosphorus pentasulfide ($P_2S_5$) is more preferred. Phosphorus compounds such as diphosphorus pentasulfide ($P_2S_5$) and a phosphorus elementary substance may be any ones that are industrially produced and commercially available, with no specific limitation for use herein.

The solid raw materials containing a lithium element, a phosphorus element and a sulfur element preferably contain at least one of a lithium compound and a lithium metal elementary substance, and at least one of a phosphorus compound and a phosphorus elementary substance. Above all, a combination of a lithium compound and a phosphorus compound is preferred, a combination of a lithium compound and a phosphorus sulfide is more preferred, a combination of a lithium sulfide and a phosphorus sulfide is even more preferred, and a combination of a lithium sulfide and a diphosphorus pentasulfide is especially more preferred.

Not specifically limited, the amount of the lithium element-containing solid raw materials and the phosphorus element-containing solid raw materials to be used may be adequately determined based on the desired crystalline solid electrolyte. For example, when lithium sulfide ($Li_2S$) is used as the lithium element-containing solid raw material and when diphosphorus pentasulfide ($P_2S_5$) is used as the phosphorus element-containing solid raw material, the ratio of $Li_2S$ to the total of $Li_2S$ and $P_2S_5$ is, from the viewpoint of obtaining a crystalline solid electrolyte having high chemical stability by employing a composition close to the ortho-composition to be mentioned hereinunder, preferably within a range of 68 to 82 mol %, more preferably within a range of 70 to 80 mol %, even more preferably within a range of 72 to 78 mol %, and especially more preferably within a range of 74 to 76 mol %.

Also preferably, the solid raw materials further contain at least one kind of halogen elements such as fluorine (F), chlorine (Cl), bromine (Br) and iodine (I), more preferably at least one of chlorine (Cl), bromine (Br) and iodine (I), even more preferably at least one of bromine (Br) and iodine (I). For example, a halogen-containing compound represented by the following general formula (1) is preferably contained.

$$M_l X_m \qquad (1)$$

In the general formula (1), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or those formed of the element with an oxygen element and a sulfur element bonding thereto. Lithium (Li) or phosphorus (P) is preferred, and lithium (Li) is especially preferred.

X represents a halogen element selected from fluorine (F), chlorine (Cl), bromine (Br) and iodine (I).

l is an integer of 1 or 2, and m is an integer of 1 to 10. When m is an integer of 2 to 10, that is, when the formula has plural X's, X's may be the same or different. For example, regarding $SiBrCl_3$ to be mentioned below, m is 4, and X are different elements of Br and Cl.

Specifically, examples of the halogen-containing compound represented by the above general formula (1) include sodium halides such as NaI, NaF, NaCl, NaBr, etc.; lithium halides such as LiF, LiCl, LiBr, LiI, etc., boron halides such as $BCl_3$, $BBr_3$, $BI_3$, etc., aluminum halides such as $AlF_3$, $AlBr_3$, $AlI_3$, $AlCl_3$, etc., silicon halides such as $SiF_4$, $SiCl_4$, $SiCl_3$, $Si_2Cl_6$, $SiBr_4$, $SiBrCl_3$, $SiBr_2Cl_2$, $SiI_4$, etc. phosphorus halides such as $PF_3$, $PF_5$, $PCl_3$, $PCl_5$, $POCl_3$, $PBr_3$, $POBr_3$, $PI_3$, $P_2Cl_4$, $P_2I_4$, etc., sulfur halides such as $SF_2$, $SF_4$, $SF_6$, $S_2F_{10}$, $SCl_2$, $S_2Cl_2$, $S_2Br_2$, etc., germanium halides such as $GeF_4$, $GeCl_4$, $GeBr_4$, $GeI_4$, $GeF_2$, $GeCl_2$, $GeBr_2$, $GeI_2$, etc., arsenic halides such as $AsF_3$, $AsCl_3$, $AsBr_3$, $AsI_3$, $AsF_5$, etc., selenium halides such as $SeF_4$, $SeF_6$, $SeCl_2$, $SeCl_4$, $Se_2Br_2$, $SeBr_4$, etc., tin halides such as $SnF_4$, $SnCl_4$, $SnBr_4$, $SnI_4$, $SnF_2$, $SnCl_2$, $SnBr_2$, $SnI_2$, etc., antimony halides such as $SbF_3$, $SbCl_3$, $SbBr_3$, $SbI_3$, $SbF_5$, $SbCl_5$, etc., tellurium halides such as $TeF_4$, $Te_2F_{10}$, $TeF_6$, $TeCl_2$, $TeCl_4$, $TeBr_2$, $TeBr_4$, $TeI_4$, etc., lead halides such as $PbF_4$, $PbCl_4$, $PbF_2$, $PbCl_2$, $PbBr_2$, $PbI_2$, etc., bismuth halides such as $BiF_3$, $BiCl_3$, $BiBr_3$, $BiI_3$, etc.

As the above-mentioned halogen-containing compound, lithium halides such as lithium chloride (LiCl), lithium bromide (LiBr), lithium iodide (LiI), etc., and phosphorus halides such as phosphorus pentachloride ($PCl_5$), phosphorus trichloride ($PCl_3$), phosphorus pentabromide ($PBr_5$), phosphorus tribromide ($PBr_3$), etc. are preferred. Above all, lithium halides such as lithium chloride (LiCl), lithium bromide (LiBr), lithium iodide (LiI), etc., and phosphorus tribromide ($PBr_3$) are preferred; and lithium halides such as lithium chloride (LiCl), lithium bromide (LiBr), lithium iodide (LiI), etc. are more preferred; and lithium bromide (LiBr) and lithium iodide (LiI) are especially preferred. As the halogen-containing compound, one alone or two or more kinds of the above-mentioned compounds may be used either singly or as combined. Namely, at least one of the above-mentioned compounds may be used.

For example, in the case where lithium bromide (LiBr) and lithium iodide (LiI) are used as the halogen-containing compound, the total amount to be used of lithium bromide (LiBr) and lithium iodide (LiI) in the solid raw materials for use for production of a crystalline solid electrolyte is not specifically limited so far as the ratio can give a desired crystalline solid electrolyte, but for example, the amount preferably falls within a range of 3 to 40 mol %, more preferably within a range of 3 to 35 mol %, even more preferably within a range of 3 to 30 mol %. For example, the amount may fall within a range of 5 mol % or more and 28 mol % or less, a range of 8 mol % or more and 28 mol % or less, a range of 10 mol % or more and 28 mol % or less, a range of 12 mol % or more and 28 mol % or less, or a range of 15 mol % or more and 28 mol % or less.

The proportion of lithium bromide (LiBr) to the total of lithium bromide (LiBr) and lithium iodide (LiI) (LiBr/(LiI+LiBr)) is not specifically limited, and any desired ratio may be employed, but the proportion is preferably such that an Li ion conductivity not lower than the same level relative to the crystalline solid electrolyte (crystalline solid electrolyte as a comparative subject) prepared in the same manner except that lithium bromide (LiBr) is substituted with lithium iodide (LiI) could be obtained, and more preferably such that an Li ion conductivity higher than the comparative subject, crystalline solid electrolyte can be obtained. The proportion of the above-mentioned lithium bromide (LiBr) is, for example, within a range of 1 to 99 mol %, more preferably within a range of 5 to 75 mol %. For example, the proportion may fall within a range of 20 mol % or more and 75 mol % or less, or 40 mol % or more and 72 mol % or less, or 50 mol % or more and 70 mol % or less.

Preferably, the proportion of lithium iodide (LiI) in all the materials for use in production of the crystalline solid electrolyte is more than 3 mol % but less than 20 mol %, and the proportion of lithium bromide (LiBr) in all the materials is preferably 3 to 20 mol %.

In the case where the crystalline solid electrolyte has a composition of $a((1-b)LiI.bLiBr).(1-a)(cLi_2S.(1-c)P_2S_5)$, a corresponds to the total proportion of the above-mentioned LiI and LiBr, b corresponds to the proportion of the above-mentioned LiBr, and c corresponds to the proportion of the above-mentioned $Li_2S$.

The particle size of the above-mentioned solid raw materials may be any particle size that each of the above-mentioned raw materials generally has with no specific limitation. For example, the particle size of lithium sulfide may be 0.01 to 3 mm, the particle size of diphosphorus pentasulfide may be 0.01 to 3 mm. The particle size of lithium bromide may be 0.01 to 3 mm, and the particle size of lithium iodide may be 0.01 to 3 mm. In that manner, the particle size range of the solid raw materials for use in the present invention is broad, and using a multi-axial kneading machine, a solid electrolyte can be produced irrespective of the particle size of the solid raw materials. Here, the mean particle size is a value to be measured using a laser diffractometric particle sizer (for example, Master Sizer 2000 manufactured by Malvern Instruments, Ltd.).

The above-mentioned solid raw materials may be used directly as they are, but may be used in the form of a slurry thereof with an organic solvent. In the present invention, in consideration of productivity and mass-productivity, an organic solvent is used as little as possible, and using solid raw materials directly as they are, that is, using them in a solid state is preferred in reaction.

Depending on the kind of solid raw materials, production would be easy along with using an organic solvent. Examples of the organic solvent for use in such a case include an organic solvent having a boiling point of 200° C. or higher. Such organic solvents include dialcohols such as 1,2-butanediol, 1,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,5-hexanediol, 1,6-hexanediol, and derivatives thereof, etc. In the present invention, one alone or two or more kinds of these organic solvents may be used either singly or as combined.

In the case where an organic solvent is used, the amount thereof to be used is preferably such that the total amount of the solid raw materials to be added relative to 1 liter of the organic solvent could be 0.001 to 1 kg, more preferably 0.005 to 0.5 kg, more preferably 0.01 to 0.3 kg. The amount of the organic solvent to be used is preferably as small as possible.

(Multi-Axial Kneading Machine)

The multi-axial kneading machine for use in the production method of the present invention is, for example, provided with a casing and two or more rotary shafts arranged to run through the casing in the longitudinal direction and equipped with paddles (screw blades) along the axial direction, in which one end in the longitudinal direction of the casing is provided with a supply port for solid raw materials and the other end is provided with a discharge port, and the machine is not specifically limited in point of the other constitution. It is considered that, by rotating the two or more rotary shafts provided with paddles in such a multi-axial kneading machine, two or more rotary movements may interact with each other to form shearing stress, and the shearing stress may be imparted to the solid raw materials moving from the supply port toward the discharge port along the rotary axis, and the raw materials could be thereby reacted and crystallized.

One preferred example of the multi-axial kneading machine usable in the present invention is described with reference to FIGS. 1 and 2. FIG. 1 is a plane view cut at the center of the rotary shaft of a kneading machine, and FIG. 2 is a plan view cut vertically to the rotary shaft in a part provided with paddles of the rotary shaft.

The multi-axial kneading machine shown in FIG. 1 is a biaxial kneading machine provided with a casing 1 provided with a supply port 2 at one end and a discharge port 3 at the other end, and two rotary shafts 4a and 4b arranged to run through in the longitudinal direction of the casing 1. The rotary shafts 4a and 4b each are provided with paddles 5a and 5b, respectively. Solid raw materials enter the casing 1 via the supply port 2, and are reacted with each other and crystallized, as given shearing stress at the paddles 5a and 5b, and the resultant reaction product, that is, a crystalline solid electrolyte is discharged out via the discharge port 3.

Not specifically limited, the number of rotary shafts 4 (4a, 4b) may be 2 or more, and in consideration of general versatility, the number is preferably 2 to 4, more preferably 2.

The rotary shafts 4 may be parallel shafts that are parallel to each other, or may be oblique shafts, and the rotating direction of the rotary shafts may be in the same direction or in different directions. For obtaining a better kneading effect, the rotating direction is preferably in different directions, or in the case where a self-cleaning effect of sweeping up the solid raw materials and the reaction product in the casing and preventing them from staying in the casing is considered to be important, the same direction may be selected for the rotating direction.

Paddles 5 (5a, 5b) are fixed to the rotary shafts for kneading solid raw materials, and are referred to as screw blades. Not specifically limited, the cross-sectional form thereof includes, as shown in FIG. 2, a nearly triangle form modified from a regular triangle by making each side thereof have a uniformly convexed arc, and in addition thereto, a circular form, an oval form, a nearly square form, etc., and may additionally include modifications based on these forms and having a partial cutout.

In the case where the machine is provided with plural paddles, each paddle may be fixed to the rotary shaft at a different angle, as shown in FIG. 2. The paddles may be engaging ones or non-engaging ones, but for obtaining a better kneading effect, engaging paddles may be selected.

For smoothly supplying solid raw materials thereinto, the multi-axial kneading machine may be provided with screws 6 (6a, 6b) on the side of the supply port 2 as shown in FIG. 1, and for staying the reaction product obtained via the paddles 5 inside the casing, reverse screws 7 (7a, 7b) may be arranged on the side of the discharge port 3 as shown in FIG. 1.

A commercially-available kneading machine may be used as the multi-axial kneading machine. Examples of commercially-available multi-axial kneading machines include KRC Kneader, KRC Junior (manufactured by Kurimoto, Ltd.), etc., and depending on the kinds of solid raw materials and on the desired scale, the machine may be adequately selected.

For producing a crystalline solid electrolyte, a method of preparing an amorphous solid electrolyte according to a mechanical milling method, a slurry method, a melting and rapidly cooling method or the like as described above followed by further heat-treating the resultant amorphous solid electrolyte has heretofore been generally employed. These methods could not be said to be excellent in productivity since they require a special equipment or must use a hydrocarbon-based organic solvent. However, by reacting solid raw materials using a generalized machine such as a multi-axial kneading machine as in the present invention, excellent productivity could be realized, as compared with these production methods.

(Reaction Conditions)

In the present invention, the reaction temperature for the solid raw materials is preferably not lower than the crystallization temperature of the crystal structure that the crystalline solid electrolyte obtained by the reaction of the solid raw materials has. By the reaction at such a temperature, the solid raw materials can be reacted and crystallized to give a crystalline solid electrolyte, and therefore the intended solid electrolyte can be obtained with excellent productivity.

Here, the crystallization temperature in the present invention is a crystallization temperature of the crystal structure that the crystalline solid electrolyte has, that is, a crystallization temperature of the amorphous solid electrolyte obtained using the solid raw materials necessary for producing the crystalline solid electrolyte, and can be confirmed and measured through differential thermal analysis (DTA). For example, using a differential thermal analyzer (DTA device), a sample is heated at a heating condition of 10° C./min for differential thermal analysis (DTA), in which a temperature indicating the exothermic peak to be detected on the lowermost side is the crystallization temperature of the sample.

The crystallization temperature differs depending on the kind and the compositional ratio of the elements constituting the resultant crystalline solid electrolyte and on the difference in the structure thereof, and, for example, the crystallization temperature of the crystal structure that an $Li_2S$—$P_2S_5$-based crystalline solid electrolyte has, falls, for example, within a range of 210 to 340° C., the crystallization temperature of the crystal structure that an $Li_2S$—$P_2S_5$—LiBr-based crystalline solid electrolyte has, falls, for example, within a range of 170 to 290° C., the crystallization temperature of the crystal structure that an $Li_2S$—$P_2S_5$—LiI-based crystalline solid electrolyte has falls, for example, within a range of 140 to 260° C., and the crystallization temperature of the crystal structure that an $Li_2S$—$P_2S_5$—LiI—LiBr-based crystalline solid electrolyte has falls, for example, within a range of 140 to 260° C. The reaction temperature in producing these crystalline solid electrolytes may be one not lower than the crystallization temperature of the crystal structure that each solid electrolyte has.

In the present invention, the reaction temperature is, from the viewpoint of obtaining a crystalline solid electrolyte, preferably one not lower than the above-mentioned crystallization temperature, and the specific temperature could not be indiscriminately defined since, as mentioned above, the crystallization temperature varies depending on the kind and the compositional ratio of the constituent elements and on the difference in the structure thereof. For example, the reaction temperature is preferably 120 to 350° C., more preferably 130 to 320° C., even more preferably 140 to 280° C., and especially preferably 150 to 250° C.

As a method for controlling the reaction temperature for solid raw materials, a method generally used in a multi-axial kneading machine may be employed. For example, the method includes a method of controlling the supply amount of solid raw materials, a method of controlling the driving power, a method of controlling the rotation number, a method of cooling the system, etc. In the method of controlling the supply amount of solid raw materials, in general, when the supply amount is increased, the temperature tends to rise. In the method of controlling driving power, in general, when the driving power is increased, the temperature tends to rise. In the method of controlling the rotation number, in general, when the rotation number is increased, the temperature tends to rise.

The rotation number of the rotary shaft of the multi-axial kneading machine differs, depending on the kind and the compositional ratio of the elements constituting the crystalline solid electrolyte to be produced and on the difference in the structure thereof, and therefore could not be indiscriminately stated, but is preferably 40 to 300 rpm, more preferably 40 to 250 rpm, even more preferably 40 to 200 rpm.

For obtaining the crystalline solid electrolyte, as needed, a jacket heater (hot water heater, electric heater) or the like may be used to heat the reactor for raw materials such as the casing or the like of the multi-axial kneading machine.

Regarding the reaction of solid raw materials, the crystalline solid electrolyte to be obtained may change when brought into contact with water or oxygen, and therefore, supply and reaction of the solid raw materials as well as discharge of the reaction product are preferably carried out in an inert gas atmosphere. In this case, the inert gas includes nitrogen, argon, etc.

Also preferably, the reaction of solid raw materials is carried out in a dry atmosphere, for example, preferably in an atmosphere at the dew point −90° C. or higher and −40° C. or lower, more preferably in an atmosphere at the dew point −90° C. or higher and −45° C. or lower, even more preferably at the dew point −90° C. or higher and −50° C. or lower. For realizing this, for example, a method of arranging the multi-axial kneading machine in a glove box, or a method of arranging the multi-axial kneading machine in a dry room may be employed. Also for example, a method of continuously supplying the above-mentioned inert gas into the casing of the multi-axial kneading machine can realize the above. In this case, the casing of the multi-axial kneading machine may be provided with a supply port and a discharge port for an inert gas.

The reaction time for the solid raw materials varies depending on the kind and the compositional ratio of the elements to constitute the crystalline solid electrolyte to be obtained, on the difference in the structure thereof, and on the temperature at the reaction, and therefore may be adequately controlled. Preferably, the time is 5 minutes to 50 hours, more preferably 10 minutes to 15 hours, even more preferably 1 to 12 hours.

In using the multi-axial kneading machine, the reaction product discharged out through the discharge port may be again supplied thereinto through the supply port depending on the degree of the reaction procedure to thereby further carry out the reaction. The degree of reaction procedure may be known by the change of the peaks derived from the solid electrolyte raw materials, and at the time when the peaks could be detected no more, it may be considered that the reaction has fully proceeded.

(Heat Treatment)

In the present invention, from the viewpoint of further improving the crystallinity of the crystalline solid electrolyte obtained in the manner as above, heat treatment may be carried out. Specifically, the production method of the present invention may further include heat treatment of the crystalline solid electrolyte.

The heat treatment temperature is preferably within a range of ±40° C. from the peak top, as the origination, of the exothermic peak detected on the lowermost temperature side in differential thermal analysis (DTA) at a heating condition of 10° C./min using a differential thermal analyzer (DTA device), for the amorphous solid electrolyte obtained using the solid raw materials necessary for obtaining the desired crystalline solid electrolyte, more preferably ±30° C., even more preferably ±20° C.

Not specifically limited, the heat treatment time may be any time in which the desired crystallinity can be obtained but is, for example, preferably within a range of 1 minute or more and 24 hours or less, more preferably within a range of 1 minute or more and 10 hours or less.

Preferably, the heat treatment is carried out in an inert gas atmosphere (for example, nitrogen atmosphere, argon atmosphere), or in a reduced-pressure atmosphere (especially in vacuum). This is because the crystalline solid electrolyte can be protected from degradation (for example, oxidation). The heat treatment method is not specifically limited. For example, a method of using a vacuum heating device, an argon gas atmosphere furnace, a firing furnace or the like may be employed.

(Crystalline Solid Electrolyte)

The crystalline solid electrolyte obtained according to the production method of the present invention includes a crystalline solid electrolyte that contains, for example, at least one element selected from alkali metals such as lithium, sodium, potassium, rubidium, cesium, francium, etc., and alkaline earth metals such as beryllium, magnesium, calcium, strontium, barium, radium, etc., as a conductive species. Among those elements, in consideration of the ability of high ion conductivity and the ability to realize high output power of batteries, an alkali metal such as lithium, sodium, potassium, rubidium, cesium, francium, etc., and beryllium are preferred, and lithium is especially preferred.

The crystalline solid electrolyte includes a crystalline oxide solid electrolyte, a crystalline sulfide solid electrolyte, etc., and in consideration of the ability of high ion conductivity and the ability to realize high output power of batteries, a crystalline sulfide solid electrolyte is preferred.

Examples of the crystalline sulfide solid electrolyte include a crystalline sulfide solid electrolyte containing a lithium element, a phosphorus element and a sulfur element, a crystalline sulfide solid electrolyte containing a lithium element, a phosphorus element, a sulfur element and a halogen element, a crystalline sulfide solid electrolyte containing a lithium element, a phosphorus element, a sulfur element and a bromine element, a crystalline sulfide solid electrolyte containing a lithium element, a phosphorus element, a sulfur element and an iodine element, and a crystalline sulfide solid electrolyte containing a lithium element, a phosphorus element, a sulfur element, a bromine element and an iodine element. More specifically, the crystalline sulfide solid electrolyte includes $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$LiI$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n each are a positive number, Z represents any of Si, Ge, Zn, Ga, Sn, $Li_2S$—$GeS_2$, $Li_2S$—$SiS_2$—$Li_3PO_4$, $Li_2S$—$SiS_2$—$Li_xMO_y$, (x and y each are a positive number, M represents any of P, Si, Ge, B, Al, Ga, $Li_{10}GeP_2S_{12}$, etc.

The crystalline oxide solid electrolyte includes $Li_2O$—$B_2O_3$—$P_2O_5$, $Li_2O$—$SiO_2$, LiLaTaO (for example, $Li_5La_3Ta_2O_{12}$), LiLaZrO (for example, $Li_7La_3Zr_2O_{12}$), LiBaLaTaO (for example, $Li_6BaLa_2Ta_2O_{12}$), $Li_{1+x}Si_xP_{1-x}O_4$ ($0 \leq x < 1$, for example, $Li_{3.6}Si_{0.6}P_{0.4}O_4$), $Li_{1+x}Al_xGe_{2-x}(PO_4)_3$ ($0 \leq x \leq 2$), $Li_{1+x}Al_xTi_{2-x}(PO_4)_3$ ($0 \leq x \leq 2$), $Li_3PO_{(4-3/2x)}N_x$ ($0 \leq x < 1$), etc.

The kind of the elements constituting the crystalline solid electrolyte obtained according to the production method of the present invention can be identified, for example, by an ICP emission spectrometer.

For example, the crystal structure of the crystalline sulfide solid electrolyte includes an $Li_3PS_4$ crystal structure, an $Li_4P_2S_6$ crystal structure, an $Li_7PS_6$ crystal structure, an $Li_7P_3S_{11}$ crystal structure, an $Li_{4-x}Ge_{1-x}P_xS_4$-based thio-LISICON Region II-type crystal structure (see Kanno, et al., Journal of The Electrochemical Society, 148 (7) A742-746 (2001)), a crystal structure similar to the $Li_{4-x}Ge_{1-x}P_xS_4$-based thio-LISICON Region II-type crystal structure (see Solid State Ionics, 177 (2006), 2721-2725), etc.

In X-ray diffractometry thereof using a CuKα ray, the $Li_3PS_4$ crystal structure gives diffraction peaks, for example, at around 2θ=17.5°, 18.3°, 26.1°, 27.3°, 30.0°; the $Li_4P_2S_6$ crystal structure gives diffraction peaks, for example, at around 2θ=16.9°, 27.1°, 32.5°; the $Li_7PS_6$ crystal structure gives diffraction peaks, for example, at around 2θ=15.3°, 25.2°, 29.6°, 31.0°; the $Li_7P_3S_{11}$ crystal structure gives diffraction peaks, for example, at around 2θ=17.8°, 18.5°, 19.7°, 21.8°, 23.7°, 25.9°, 29.6°, 30.0°; the $Li_{4-x}Ge_{1-x}P_xS_4$-based thio-LISICON Region II-type crystal structure gives diffraction peaks, for example, at around 2θ=20.1°, 23.9°, 29.5°; and the crystal structure similar to the $Li_{4-x}Ge_{1-x}P_xS_4$-based thio-LISICON Region II-type crystal structure gives diffraction peaks, for example, at around 2θ=20.2, 23.6°. The position of these peaks may vary within a range of ±0.5°.

The crystal structure of the crystalline solid electrolyte also includes an argyrodite-type crystal structure. Examples of the argyrodite-type crystal structure include an $Li_7PS_6$ crystal structure; a crystal structure represented by a compositional formula $Li_{7-x}P_{1-y}Si_yS_6$ or $Li_{7+x}P_{1-y}Si_yS_6$ (x is −0.6 to 0.6, y is 0.1 to 0.6) which has a structure skeleton of $Li_7PS_6$ and in which a part of P is substituted with Si; a crystal structure represented by $Li_{7-x-2y}PS_{6-x-y}Cl_x$ ($0.8 \leq x \leq 1.7$, $0 < y \leq -0.25x+0.5$); a crystal structure represented by $Li_{7-x}PS_{6-x}Ha_x$ (Ha represents Cl or Br, x is preferably 0.2 to 1.8).

The crystal structure represented by a compositional formula $Li_{7-x}P_{1-y}Si_yS_6$ or $Li_{7+x}P_{1-y}Si_yS_6$ (x is −0.6 to 0.6, y is 0.1 to 0.6), which has the above-mentioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the above-mentioned compositional formula $Li_{7-x-2y}PS_{6-x-y}Cl_x$ ($0.8 \leq x \leq 1.7$, $0 < y \leq -0.25x+0.5$) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the above-mentioned compositional formula $Li_{7-x}PS_{6-x}Ha_x$ (Ha represents Cl or Br, x is preferably 0.2 to 1.8) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

The crystal structure of the crystalline solid electrolyte includes one represented by a compositional formula $Li_xSi_yP_zS_aHa_w$ (Ha includes any one or more of Br, Cl, I and F, $2.4 < (x-y)/(y+z) < 3.3$) and having an S content of 55 to 73% by mass, an Si content of 2 to 11% by mass and an Ha element content of 0.02% by mass or more, more preferably a crystal structure that gives, in X-ray diffractometry using a CuKα ray, peaks derived from an Li—Si—P—S-type crystal structure and appearing at 2θ=20.2°, 24.0°, and 29.7°, and peaks appearing at 2θ=24.8° to 26.1°. These peak positions may vary within a range of ±0.5°.

The crystalline solid electrolyte obtained according to the present invention preferably has a constitution that contains an ion conductor having a lithium element (Li), a phosphorus element (P), and a sulfur element (S), more preferably a constitution that contains the ion conductor and lithium iodide (LiI) and lithium bromide (LiBr).

The above-mentioned ion conductor is not specifically limited and may be any one having a lithium element (Li), a phosphorus element (P) and a sulfur element (S). Above all, the ion conductor preferably has an ortho composition. This is because the ortho composition can provide a sulfide solid electrolyte having high chemical stability. Here, in general, ortho means one having a highest hydration degree among oxo-acids produced by hydration of a same oxide. In the present invention, a crystal composition where lithium sulfide ($Li_2S$) among sulfides mostly has been added is referred to as an ortho composition. For example, in an $Li_2S$—$P_2S_5$ system, $Li_3PS_4$ corresponds to an ortho composition. In the case where the crystalline sulfide solid electrolyte is $Li_2S$—$P_2S_5$, the proportion of lithium sulfide ($Li_2S$) to diphosphorus pentasulfide ($P_2S_5$) capable of forming an ortho composition is $Li_2S:P_2S_5=75:25$ by mol.

Here, "having an ortho composition" includes not only a strict ortho composition alone but also compositions close thereto. Specifically, the wording indicates mainly the anion structure ($PS_4^{3-}$ structure) of the ortho composition. The proportion of the anion structure in the ortho composition is preferably 60 mol % or more relative to all the anion structures in an ion conductor, more preferably 70 mol % or more, even more preferably 80 mol % or more, still more preferably 90 mol % or more. The proportion of the anion structure in the ortho composition may be determined through Raman spectrometry, nuclear magnetic resonance (NMR), X-ray photoelectron spectrometry (XPS) or the like.

Preferably, the crystalline sulfide solid electrolyte obtained as the crystalline solid electrolyte according to the present invention does not substantially contain a crosslinked sulfur. This is because the crystalline solid electrolyte could be one with little hydrogen sulfide emission. "Crosslinked sulfur" is a crosslinked sulfur in a compound produced by reaction of lithium sulfide ($Li_2S$) and diphosphorus pentasulfide ($P_2S_5$). For example, the crosslinked sulfur in a structure $S_3P$—S—$PS_3$ formed by reaction of lithium sulfide ($Li_2S$) and diphosphorus pentasulfide ($P_2S_5$) corresponds thereto. The crosslinked sulfur of the type readily reacts with water to generate hydrogen sulfide. For example, when the proportion of lithium sulfide ($Li_2S$) in all the raw materials is small, a crosslinked sulfur is readily formed. "Not substantially containing a crosslinked sulfur" can be confirmed through Raman spectrometry. For example, in the case of a $Li_2S$—$P_2S_5$-based sulfide solid electrolyte, in general, a peak of a structure $S_3P$—S—$PS_3$ appears at 402 $cm^{-1}$. Consequently, it is desirable that the peak is not detected. In addition, a peak of a structure $PS_4^{3-}$ generally appears at 417 $cm^{-1}$. In the present invention, preferably, the intensity $I_{402}$ at 402 $cm^{-1}$ is smaller than the intensity $I_{417}$ at 417 $cm^{-1}$. More specifically, for example, the intensity $I_{402}$ is preferably 70% or less of the intensity $I_{417}$, more preferably 50% or less, even more preferably 35% or less.

Examples of the shape of the crystalline solid electrolyte include granules, though not specifically limited thereto. The mean particle size ($D_{50}$) of the granular crystalline solid electrolyte is, for example, preferably within a range of 0.1 μm to 50 μm. The mean particle size ($D_{50}$) means a particle size to reach 50% of all the particles as sequentially integrated from the particles having a smallest particle size on the particle size distribution cumulative curve drawn with particles, and the volumetric distribution can be measured, for example, using a laser diffraction/scattering particle size distribution measuring device.

The crystalline solid electrolyte obtained by the production method of the present invention has a high ion conductivity and excellent battery performance, and are therefore favorably used in batteries. The solid electrolyte using a lithium element as the conductive species is especially favorable. The solid electrolyte obtained according to the production method of the present invention may be used in a positive electrode layer or a negative electrode layer, or may also be used in an electrolyte layer. Each layer may be produced according to a known method.

The above-mentioned battery preferably uses a collector in addition to the positive electrode layer, the electrolyte layer and the negative electrode layer, and the collector may be any known one. For example, a layer formed by coating Au, Pt, Al, Ti, Cu or the like capable of reacting with the above-mentioned solid electrolyte, with Au or the like may be used.

[Production Method for Inorganic Material]

The production method for an inorganic material of the present invention includes reacting two or more kinds of solid raw materials using a multi-axial kneading machine to give a crystalline inorganic material. Not specifically limited, the solid raw materials may be any ones that react with each other to give a crystalline inorganic material, and examples thereof include a zinc sulfide-type light emitting material, a molybdenum sulfide-type and vanadium alloy-type thermoelectric conversion materials, etc.

As the multi-axial kneading machine, the same one as that used in the production method for the solid electrolyte of the present invention may be employed.

The temperature at the reaction of the solid raw materials is preferably not lower than the crystallization temperature of the crystal structure that the crystalline solid electrolyte obtained by the reaction of the solid raw materials has, and the other reaction conditions are the same as those in the above-mentioned solid electrolyte production method, and by heat-treating the resultant crystalline inorganic material, the crystallinity thereof can be further improved like in the above-mentioned solid electrolyte production method.

According to the production method for an inorganic material of the present invention, two or more kinds of solid raw materials may be reacted using a generalized machine such as a multi-axial kneading machine to produce a large variety of inorganic materials in a simplified manner with excellent productivity and mass-productivity.

[Multi-Axial Kneading Machine]

The multi-axial kneading machine of the present invention is used for production of a crystalline solid electrolyte according to the production method for a solid electrolyte of the present invention that includes reacting two or more kinds of solid raw materials. The structure and the use conditions for the multi-axial kneading machine of the present invention are the same as those described hereinabove in the section of the solid electrolyte production method of the present invention.

EXAMPLES

Next, the present invention is described specifically with reference to Examples, but the present invention is not whatsoever restricted by these Examples.

(Measurement of Ion Conductivity ($\sigma$))

The solid electrolytes obtained in Examples and Comparative Examples were respectively shaped into a form having a cross section of 10 mm$\phi$ (cross-sectional area S=0.785 cm$^2$) and a height (L) of 0.1 to 0.3 cm, thereby preparing sample pieces. From the top and the bottom of the each sample piece, electrode terminals were taken, and the ion conductivity was measured according to an alternate current impedance method (frequency range: 5 MHz to 0.5 Hz, amplitude: 10 mV) to give a Cole-Cole plot. In the vicinity of the right end of the arc observed in the high-frequency side region, a real number part Z' ($\Omega$) at the point at which −Z'' ($\Omega$) is the smallest was referred to as a bulk resistance R ($\Omega$) of the electrolyte, and according to the following equation, the ion conductivity 6 (S/cm) was calculated.

$R = \rho(L/S)$ $\sigma = 1/\rho$

In Examples, the lead distance was about 60 cm.

(Measurement of Purity of Lithium Sulfide)

The purity of lithium sulfide was measured by analysis with hydrochloric acid titration and silver nitrate titration. Specifically, the lithium sulfide powder obtained in Production Example was metered in a glove box (dew point: about −100° C., nitrogen atmosphere), dissolved in water, measured using a potentiometric titrator ("COM-980 (model number)", manufactured by Hiranuma Sangyo Co., Ltd.), and calculated.

Production Example: Synthesis of Lithium Sulfide (Li$_2$S)

200 g of lithium hydroxide (LiOH) anhydride (manufactured by The Honjo Chemical Corporation) dried in a nitrogen flow current was put into a 500-ml separable flask equipped with a stirrer. This was heated in a nitrogen flow current, the internal temperature was kept at 200° C., and nitrogen was changed to hydrogen sulfide (manufactured by Sumitomo Seika Chemicals Co., Ltd.) and supplied at a flow rate of 500 mL/min to promote the reaction of lithium hydroxide and hydrogen sulfide. Water to form with the procedure of the reaction was condensed with a condenser and recovered. At the time when the reaction was carried out for 6 hours (6 hours after hydrogen sulfide introduction), 144 mL of water was recovered. The reaction was further continued for 3 hours, but there occurred no water generation. A powdery reaction product was recovered, and the purity thereof was measured according to the above-mentioned method, and the purity was 98.5%. In powdery X-ray diffractometry (XRD), the product gave a peak pattern peculiar to lithium sulfide (Li$_2$S).

Example 1

In a glove box filled with nitrogen, a feeder ("Micron Feeder (product name)", manufactured by Aishin Nano Technologies Co., Ltd.), and a biaxial kneading machine ("KRC Junior (product name)", paddle diameter: $\phi$8 mm, manufactured by Kurimoto, Ltd.) were arranged. A mixture of 3.828 g of lithium sulfide (Li$_2$S) obtained in Production Example and 6.172 g of diphosphorus pentasulfide (P$_2$S$_5$) (Li$_2$S:P$_2$S$_5$=75:25 (molar ratio)) as solid raw materials was fed to the supply port of the kneading machine from the feeder at a constant rate, and began to be kneaded at a mean motor torque of 0.8 Nm (load ratio: 60%) and at a screw revolution number of 150 rpm. In about 30 minutes after the solid raw materials were supplied from the supply port, a reaction product was discharged out from the discharge port. The discharged reaction product was again returned back to the feeder and the kneading operation was repeated.

The resultant reaction product was analyzed through powdery X-ray diffractometry (XRD), and as shown in the X-ray analysis spectrum thereof in FIG. 3, a crystallization peak belonging to the crystal structure of $\beta$Li$_3$PS$_4$ was detected, and the ion conductivity of the reaction product measured according to the above-mentioned method was 2.0×10$^{-4}$ S/cm, which confirmed that a crystalline solid electrolyte having a crystal structure was obtained. The temperature at the outer surface of the casing of the kneading machine during kneading was at most 90° C.

Example 2

A reaction product was obtained in the same manner as in Example 1, except that, in Example 1, the solid raw materials were a mixture of 2.78 g of lithium sulfide (Li$_2$S), 4.435 g of diphosphorus pentasulfide (P$_2$S$_5$), 1.425 g of lithium iodide (LiI), and 1.385 g of lithium bromide (LiBr) (Li$_2$S: P$_2$S$_5$:LiI:LiBr=56.25:18.75:10:15 (molar ratio)).

The resultant reaction product was analyzed through powdery X-ray diffractometry (XRD), and as shown in the X-ray analysis spectrum thereof in FIG. 4, a crystallization peak belonging to Li$_{4-x}$Ge$_{1-x}$P$_x$S$_4$-based thio-LISICON Region II-type crystal structure was detected. The resultant reaction product was heat-treated at 200° C. for 3 hours, and the ion conductivity of the resultant product measured according to the above-mentioned method was 3.0×10$^{-3}$ S/cm, which confirmed that the product is a crystalline solid electrolyte. The temperature at the outer surface of the casing of the kneading machine during kneading was at most 80° C.

The solid electrolytes obtained in Examples all gave a crystallization peak belonging to a crystal structure, which confirmed that these solid electrolytes have a crystal structure. From this, it is considered that the reaction temperature would be a temperature not lower than the crystallization temperature (Tc) of the crystal structure that the solid electrolyte obtained in each Example has. In addition, it has also been confirmed that according to the production method of the present invention using a generalized machine such as a multi-axial kneading machine, a crystalline solid electrolyte can be obtained in a simplified manner with excellent productivity.

INDUSTRIAL APPLICABILITY

According to the present invention, a crystalline solid electrolyte can be obtained with excellent productivity. The crystalline solid electrolyte has a high ion conductivity and has excellent battery performance and is therefore favorably used in batteries. Using a lithium element as the conductive species is especially preferred.

REFERENCE SIGNS LIST

1 Casing
2 Supply Port
3 Discharge Port
4a, 4b Rotary Shaft
5a, 5b Paddle
6a, 6b Screw
7a, 7b Reverse Screw

The invention claimed is:

1. A method for producing a crystalline sulfide solid electrolyte, comprising reacting at least lithium sulfide ($Li_2S$) and diphosphorus pentasulfide ($P_2S_3$) while kneading with a multi-axial kneading machine having reverse screws to crystallize a sulfide solid electrolyte.

2. The method for producing a solid electrolyte according to claim 1, wherein the reaction is carried out in a solid state.

3. The method for producing a solid electrolyte according to claim 1, additionally comprising reacting a halogen element while kneading.

4. The method for producing a solid electrolyte according to claim 3, wherein said halogen element is at least one of bromine and iodine.

5. The method for producing a solid electrolyte according to claim 1, additionally comprising reacting at least one of lithium bromide and lithium iodide.

6. A method for producing an inorganic material, comprising reacting at least lithium sulfide ($Li_2S$) and diphosphorus pentasulfide ($P_2S_5$) while kneading with a multi-axial kneading machine to crystallize an inorganic material.

7. A multi-axial kneading machine for use in production of a crystalline sulfide solid electrolyte, the production comprising reacting at least lithium sulfide ($Li_2S$) and diphosphorus pentasulfide ($P_2S_5$) while kneading with said multi-axial kneading machine to crystallize a sulfide solid electrolyte, wherein said solid raw materials contain lithium sulfide and disphosphorus pentasulfide.

8. The method for producing a solid electrolyte according to claim 1, wherein the temperature at the reaction is not lower than the crystallization temperature of the crystal structure of the crystalline solid electrolyte.

9. The method for producing a solid electrolyte according to claim 1, wherein the temperature at the reaction is 120 to 350° C.

10. The method for producing a solid electrolyte according to claim 1, wherein the temperature at the reaction is 130 to 320° C.

11. The method for producing a solid electrolyte according to claim 1, wherein the multi-axial kneading machine has rotary shafts having paddles, screws, and reverse screws.

12. The method for producing a solid electrolyte according to claim 11, wherein the at least lithium sulfide ($Li_2S$) and diphosphorus pentasulfide ($P_2S_5$) is reacted by the shearing stress generated by the paddles.

* * * * *